(12) United States Patent
Hei et al.

(10) Patent No.: US 6,183,708 B1
(45) Date of Patent: *Feb. 6, 2001

(54) ENHANCED METHOD OF USING PEROXYACID COMPOUNDS IN ODOR REDUCTION

(75) Inventors: Robert D. P. Hei, Baldwin, WI (US); Scott P. Bennett, Stillwater, MN (US); Jay H. McLaren, Burnsville, MN (US); Guang-jong Jason Wei, Mendota Heights, MN (US); Keith D. Lokkesmoe, Savage, MN (US)

(73) Assignee: Ecolab Inc., St. Paul, MN (US)

( * ) Notice: Under 35 U.S.C. 154(b), the term of this patent shall be extended for 0 days.

This patent is subject to a terminal disclaimer.

(21) Appl. No.: 09/114,013

(22) Filed: Jul. 10, 1998

Related U.S. Application Data

(63) Continuation-in-part of application No. 09/007,225, filed on Jan. 14, 1998.

(51) Int. Cl.⁷ ......................................................... B01J 8/00
(52) U.S. Cl. ............................................................. 423/210
(58) Field of Search ............................. 423/242.3, 245.2, 423/242.1, 242.2, 236, 243.01, 238, 210, 226, 220; 252/186.25

(56) References Cited

U.S. PATENT DOCUMENTS

| | | |
|---|---|---|
| 4,421,664 | 12/1983 | Anderson et al. . |
| 4,443,342 | 4/1984 | Stas et al. . |
| 4,595,577 | 6/1986 | Stas et al. . |
| 4,874,540 | 10/1989 | Greenwald et al. . |

(List continued on next page.)

FOREIGN PATENT DOCUMENTS

| | | |
|---|---|---|
| 0 596 493 A1 | 5/1994 | (EP) . |
| 930 584 | 7/1963 | (GB) . |
| 1 370 678 | 10/1974 | (GB) . |
| 2132630 | * 7/1984 | (GB) . |
| 52-127487 | 10/1977 | (JP) . |
| 03-190995 | 8/1991 | (JP) . |

OTHER PUBLICATIONS

Aquatoc®/Auinoc® product literature.
Diversey's ODORtech™ System technical literature.
"Equipment For Gas–Liquid Operations", Chapter 6, Mass–Transfer Operations, pp. 139–195.
"Develop a Nose for Odor Control", Chemical Engineering, Oct. 1993, pp. 20–23, 27.
"Peroxygens in environmental protection", Fraser, Effluent and Water Treatment Journal, Jun. 1986, pp. 186–199.
"Removal of Nox and SO2 from Flue Gas by Peracid Solutions", Littlejohn et al., Ind. Eng. Chem. Res., 1990, 29, pp. 1420–1424.
"New Treatment Schemes Control Odors", McIlvaine, Water/Engineering & Management, Jan. 1990, pp. 28–31.
"Odors: The Other Effluent", Pope et al., Civil Engineering, Aug. 1989, pp. 42–44.

Primary Examiner—Wayne Langel
Assistant Examiner—Maribel Medina
(74) Attorney, Agent, or Firm—Merchant & Gould P.C.

(57) ABSTRACT

Disclosed is a process for the pretreatment of a plant fluid effluent containing odor compounds including an alkyl mercaptan or an alkyl thiol, an amine compound, ammonia, hydrogen sulfide and mixtures thereof by contacting the plant effluent with an atomized aqueous solution comprising a peroxy acid compound. When contacted with the peroxy acid, odor compounds in the effluent are oxidized and converted from the gaseous phase into a chemically modified highly aqueous soluble phase in the aqueous treatment. The use of such a process produces a significant improvement in odor quality index as measured by a conventional process using an expert panel when compared to conventional treatment methods.

46 Claims, 3 Drawing Sheets

U.S. PATENT DOCUMENTS

| | | |
|---|---|---|
| 4,997,450 | 3/1991 | Olson et al. . |
| 5,122,538 | 6/1992 | Lokkesmoe et al. . |
| 5,139,788 | 8/1992 | Schmidt . |
| 5,200,189 | 4/1993 | Oakes et al. . |
| 5,234,719 | 8/1993 | Richter et al. . |
| 5,268,002 | 12/1993 | Olson et al. . |
| 5,314,687 | 5/1994 | Oakes et al. . |
| 5,336,500 | 8/1994 | Richter et al. . |
| 5,370,708 | 12/1994 | Olson et al. . |
| 5,409,713 | 4/1995 | Lokkesmoe et al. . |
| 5,419,908 | 5/1995 | Richter et al. . |
| 5,436,008 | 7/1995 | Richter et al. . |
| 5,437,868 | 8/1995 | Oakes et al. . |
| 5,484,549 | 1/1996 | Hei et al. . |
| 5,489,434 | 2/1996 | Oakes et al. . |
| 5,505,915 | 4/1996 | Copeland et al. . |
| 5,567,444 | 10/1996 | Hei et al. . |
| 5,578,134 | 11/1996 | Lentsch et al. . |
| 5,674,538 | 10/1997 | Lokkesmoe et al. . |
| 5,733,474 * | 3/1998 | Kagermeier et al. ........... 252/186.25 |
| 5,861,096 * | 1/1999 | Mason et al. ........................ 210/631 |

\* cited by examiner

ENHANCED METHOD OF USING PEROXYACID COMPOUNDS IN ODOR REDUCTION

RELATED APPLICATIONS

This is a continuation-in-part of Lokkesmoe et al., U.S. Ser. No. 09/007,225, filed Jan. 14, 1998, pending, which application is expressly incorporated herein.

FIELD OF THE INVENTION

The invention relates to the use of peroxy acid compounds in odor reduction. The invention further relates to removing odor compounds from the atmosphere or from volumes of gas arising from the processing of organic materials. The processing can occur in large processing plants or in small loci such as kitchens or doctors offices. More specifically, the invention relates to an improved odor reduction process using a finely divided or atomized peroxygen compound containing spray to treat gaseous or other effluent containing odor compounds with increased efficacy. The odor can comprise organic and inorganic compounds including organic sulfur compounds, organic nitrogen compounds, organic oxo-compounds, ammonia, hydrogen sulfide, etc. and mixtures thereof. Odor is reduced by means of reacting the effluent containing the odor compounds with an aqueous odor reduction compound.

BACKGROUND OF THE INVENTION

Industrial plants, agricultural installations, hospitals, kitchens, etc. that handle large quantities of organic material such as hog farms, dairy farms, chicken farms, meat packing plants, animal rendering plants, composting plants, paper mills, sewage treatment plants and other similar installations can generate large quantities of odors that typically exit the facility in an odor contaminated atmospheric effluent flume or other effluents. Such an effluent can contain a large variety of odoriferous or odor causing inorganic and organic chemicals or molecules including organic sulfides or organic thiols (mercaptans), monoamines, diamines, triamines, ammonia, alcohols, formaldehyde, acetaldehyde, carboxylic acids, skatole, carbon disulfide and hydrogen sulfide and other odor forming oxidizable compounds. An atmospheric effluent having one or more of such compounds can have a strong odor and can be highly objectionable within the plant to plant personnel and outside the plant to plant neighbors.

An odor is a gas phase emission that produces an olfactory stimulus. The odor thresholds of many chemicals that act as odor compositions common throughout the chemical process industries include, for example, ethyl sulfide having an odor threshold in the atmosphere of 0.25 ppb, hydrogen sulfide with an odor threshold of 0.4 ppb, dimethyl sulfide with an odor threshold of 1.0 ppb, ethyl mercaptan with an odor threshold of 1.0 ppb, methyl mercaptan with an odor threshold of 1.1 ppb. With a low threshold a small amount of these and similar odors common in plant effluent are serious olfactory problems. Such odors result from processing large quantities of organic materials and are generated by the action of micro-organisms in any biologically active system on a source of organic material producing the odors.

There are many other odor producing chemicals possible, however, as shown in this representative, non-inclusive list:

| 1. Sulfur compounds | |
|---|---|
| Hydrogen Sulfide | Thiophene |
| Carbonyl Sulfide | Isobutyl Mercaptan |
| Methyl Mercaptan | Diethyl Sulfide |
| Ethyl Mercaptan | n-Butyl Mercaptan |
| Dimethyl Sulfide | Dimethyl Disulfide |
| Carbon Disulfide | 3-Methylthiophene |
| Isopropyl Mercaptan | Tetrahydrothiophene |
| tert-Butyl Mercaptan | 2, 5-Dimethylthiophene |
| n-Propyl Mercaptan | 2-Ethylthiophene |
| Ethyl Methyl Sulfide | Diethyl Disulfide |
| 2. Organic nitrogen compounds | |
| Primary amines | |
| secondary amines | |
| tertiary amines | |
| pyridines | |
| amides | |
| ammonia | |
| 3. Organic oxygen compounds (oxo-hydrocarbon compounds) | |
| primary alcohols | |
| carboxylic acids | |
| aldehydes | |
| ketone compounds | |
| phenolics | |

Attempts have been made to reduce the production of the odor compounds and to reduce the release of the odor compounds from plants. Robinson, "Develop a Nose for Odor Control", *Chemical Engineering News,* October 1993 contains a generic disclosure of odor problems and conventional odor control using aqueous treatment compositions including $H_2O_2$, $FeCl_3$, $KMnO_4$, NaOH and others. Careful control over the organic materials within the plant and reduction of microbial populations within the plant have been attempted to reduce the generation of the odor compounds in the plant atmosphere. Attempts to scrub the odor compounds from the plant atmosphere have been made using a variety of simple absorptive and oxidizing scrubbing materials with standard particle size atomized or finely divided aqueous particulate. Fragrance chemicals that simply mask the offensive odors have been tried. Sodium hydroxide (NaOH), activated carbon are useful absorptives. Oxidizing materials such as ozone ($O_3$), chlorine dioxide ($ClO_2$), sodium hypochlorite (NaClO) and others have been attempted. Some degree of success has been achieved using these oxidative materials to remove organic odor molecules from atmospheric effluents. While chlorine dioxide has had some success, chlorine dioxide is highly toxic, difficult to handle and must be generated on site. Such difficulties lead to substantial resistance to its use. Further hydrogen peroxide is also known for odor control. Hydrogen peroxide by itself is not effective against a broad range of odor constituents without additional treatment materials. However, the application of oxidative technologies including ozone, hydrogen peroxide, chlorine dioxide and other oxidants have had some limited success.

The use of peroxyacid materials in microbiological methods are also known. For example, Grosse-Bowing et al., U.S. Pat. Nos. 4,051,058 and 4,051,059 disclose peroxyacetic containing antimicrobial compositions. Stas et al., U.S. Pat. Nos. 4,443,342 and 4,595,577 disclose the treatment of waste water and waste gases containing dialkyldisulfides by metal catalytic oxidation of these compounds by means of a peroxide compound in an aqueous medium. Lokkesmoe, U.S. Pat. No. 5,409,713 teaches peroxyacetic materials as microorganism sanitizers or growth inhibitors in aqueous transport systems typically containing produce and large amounts of challenged soil load.

Fraser, in "Peroxygens in environmental protection", *Effluent and Water Treatment Journal,* June 1986 disclose that hydrogen peroxide ($H_2O_2$) can be used to reduce odor. Fraser only discusses microbial control with peroxyacetic acid and does not correlate odor control to peroxy acid treatment or concentration. Littlejohn et al., "Removal of $NO_x$ and $SO_2$ from Flue Gas by Peroxy acid Solutions", *Ind. Eng. Chem. Res.* Vol. 29, No. 7, pp. 1420–1424 (1990) disclose peroxyacids in removing nitric oxides and sulfur dioxide from coal fire derived flue gas.

Peroxyacetic acid, neat and in aqueous solution, has a strong pungent oxidizing odor resembling but stronger than acetic acid. Such materials have not been seriously considered as odor reducing materials because of the nature of its odor. The concern being that in any treatment process using a significant amount of peroxyacetic acid, the resulting treated effluent would inherently obtain the pungent odor of the peroxyacetic acid. Further, peroxyacetic acid solution inherently contain large amounts of acetic acid (HOAc).

In adsorption technology, increasing surface area equates to an increase in contact surface, thereby improving adsorption performance. Because surface area is an important criteria, there have been attempts to use fogged or atomized aqueous solutions in odor control. For example, Murray et al., U.S. Pat. No. 4,994,245, discloses the use of atomized sulfuric acid and surfactant, followed by bleach and hydrogen peroxide treatments for odor reduction. Morrison, U.S. Pat. No. 4,708,855, uses a finely divided alkali mist to reduce airborne odors in a cement plant.

BRIEF DISCUSSION OF THE INVENTION

The invention involves an improved process for removing odor compounds from an atmospheric plant fluid effluent. In the process of the invention, the plant atmosphere or other effluent is contacted with an atomized, fogged or otherwise finely divided spray of aqueous treatment solution containing a controlled amount of a peroxyacid. Sufficient peroxy acid is used to control odor but not contribute a peroxy acid smell to the treated effluent. The process is typically conducted outside the venturi restriction zone or tower packing chamber, and may be conducted alone or along with other peroxyacid treatments. In a preferred embodiment, however, the process of the invention is viewed as a pretreatment useful alongside other treatment processes. Especially preferred is the use of the process of the invention as a pretreatment alongside the liquid peroxy acid treatments described in copending patent application Ser. No. 09/007,225, filed Jan. 14, 1998 and expressly incorporated herein.

Accordingly, the invention involves a pre-treatment or post-treatment process for removing an odor from an atmosphere effluent, the process comprising contacting an atmosphere effluent comprising an odor component with a finely divided aqueous peroxy acid treatment composition, forming an oxidized odor component and dissolving the oxidized odor component or an odor component in the aqueous treatment composition; wherein the finely divided aqueous peroxy acid treatment composition has an average droplet size of 25 to 500 μm.

In another embodiment, the invention involves a process for removing an odor from an atmosphere effluent, the process comprising a pretreatment process as previously described; and subsequently contacting an atmosphere effluent comprising an odor component with a finely divided aqueous peroxy acid treatment composition, forming an oxidized odor component and dissolving the oxidized odor component or an odor component in the aqueous treatment composition to form a used treatment; and removing at least a portion of the used treatment.

In a preferred embodiment, the invention involves a pre-treatment or post-treatment process for removing an odor from an atmosphere effluent, the process comprising contacting an atmosphere effluent comprising an odor component with from about 0.1 to 3 gallons per minute of a finely divided aqueous peroxy acid treatment composition comprising at least about 100 ppm of peroxyacetic acid, at least about 100 ppm of hydrogen peroxide and at least about 20 ppm of acetic acid, forming an oxidized odor component and dissolving the oxidized odor component or an odor component in the aqueous treatment composition; wherein the finely divided aqueous peroxy acid treatment composition has an average droplet size of 25 to 500 μm.

In the treatment of gaseous effluent, when a gaseous atmospheric effluent gas phase contacts the finely divided aqueous treatment phase, oxidizable odor molecules from the gas phase react with the oxidizing peroxyacetic acid material in the aqueous treatment, are chemically converted into freely soluble compounds and is scrubbed from the gas phase. Specifically, the gas molecules contact a liquid droplet, the odor causing compounds transfer from the gas phase into the liquid phase and are then reacted with the peroxyacetic acid to form water soluble, low volatile compounds. Other soluble components of the gas phase simply are solubilized in the acidic aqueous phase. The resulting atmospheric effluent has a substantially reduced concentration of odor compound or composition and has a less objectionable odor level. For the purpose of this application, the term "active oxygen", active species" and "active ingredients" are substantially synonymous and refer to the total concentration of peroxide, peroxy acid or other available oxidizing species in a treatment that can oxidize the odor molecules or components. The term "atmospheric effluent" relates to any gaseous stream emanating from an industrial plant, agricultural facility, hospital, institutional kitchen, doctors office, household kitchen, etc. processing organic materials that result in the release of odor molecules into the atmosphere effluent. The atmosphere effluent can contain a large variety of odoriferous or odor causing chemicals or molecules including oxo-hydrocarbons, organo sulfides or organic thiols (mercaptans), monoamines, diamines, triamines, ammonia, alcohols, phenolics, formaldehyde, acetaldehyde, skatole, carbon disulfide and hydrogen sulfide and other odor forming oxidizable organic compounds. Such an atmosphere effluent typically is released in a flume that moves with the atmosphere and slowly mixes into the atmosphere, becomes diluted and dispersed into the environment. Further, not only does the peroxyacid (such as peroxyacetic acid) material result in the oxidation of odor components into freely soluble materials that remain in the aqueous phase, we have found that the use of such an acidic material results in the absorption of organic bases such as ammonia and amines resulting in the effective scrubbing of these compounds from the atmospheric effluent material.

BRIEF DISCUSSION OF THE DRAWINGS

FIG. 1*a* shows a block diagram of an odor reduction scheme as previously described, including a source of oxidant, a source of odor and effluent, a cocurrent scrubber apparatus or a counter current scrubber apparatus, the aqueous treatment and the resulting waste aqueous stream.

FIG. 1*b* shows in greater detail a small portion of FIG. 1*a,* showing how the fogging pretreatment of the invention can be incorporated into the greater odor reduction scheme seen in FIG. 1*a.*

FIG. 2b shows in greater detail a small portion of FIG. 2a, showing how the fogging pretreatment of the invention can be incorporated into the greater odor reduction scheme seen in FIG. 2a.

DETAILED DISCUSSION OF THE INVENTION

Figure 1A:
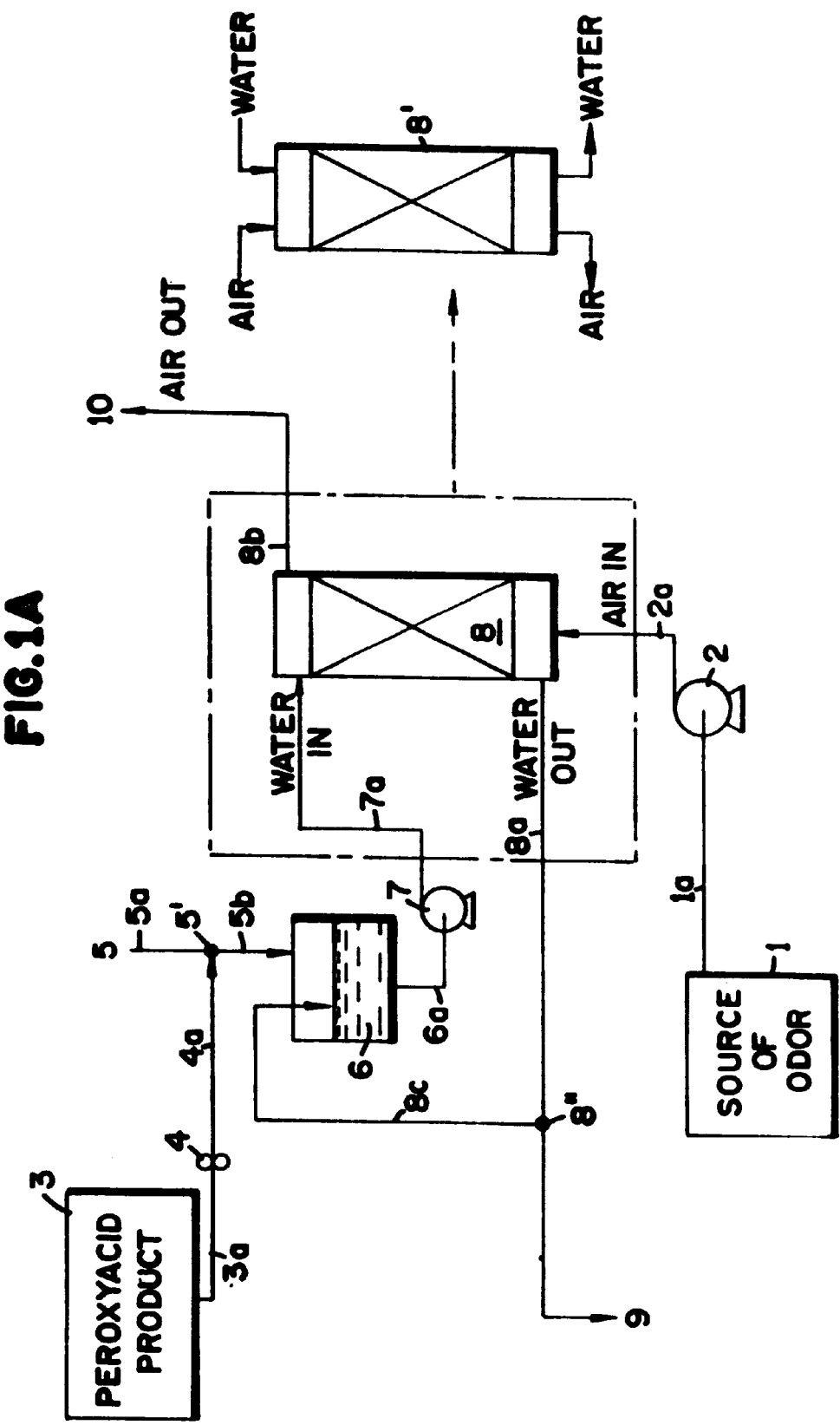

The process of the invention uses absorption, more specifically gas/liquid absorption, during and after an oxidative reaction to separate odor components from a fluid effluent. Both odor and particulate materials can be absorbed by the finely divided oxidizing liquid stream. In the process, absorption is driven by the solubility of the odor compounds, and oxidized odor materials, in the finely divided aqueous phase. At the same time, a chemical reaction between a finely divided aqueous stream and a gas stream results in washing or scrubbing oxidized odor compounds or compositions from the effluent with the liquid composition. As a result of the chemical reaction between the odor molecules in the stream and the treatment liquid, one or more of the oxidized constituents of the gas mixture will preferentially dissolve in the liquid and can thus be efficiently removed. In treatment of gaseous odor, the gas constituent reacts with the oxidant to form a highly water soluble material which forms a physical solution in the liquid and is removed from the gas stream.

The invention is concerned with a process whereby a finely divided or fogged peroxy acid composition is used to augment an odor reduction process. It has been found that a fogged peroxy acid composition is highly effective at odor reduction. Preferred average droplet size ranges from 25 to 500 $\mu$m ($10^{-6}$ m) in diameter, with a more preferred size range of 30 to 100 $\mu$m and a most preferred range of 30 to 60 $\mu$m. By contrast, conventional treatments utilize spray droplets which range from 1000 to 100,000 $\mu$m. Without being limited by theory, it is believed that the augmented effectiveness is due to the vastly greater droplet surface area, which results in a greatly expanded level of contact surface between the peroxy acid droplets and the odor causing compounds. This makes it possible to greatly reduce the volume of aqueous peroxy acid solution used. While copending application Ser. No. 09/007,225 discloses an aqueous flow rate of about 9 to 100 gallons per minute, the claimed invention is able to make effective odor control with reduced particle size at use flow rates of about 0.1 to 3 gallons per minute.

There are a number of different ways to form the droplets of the desired size. Most atomizers can be categorized into one of three common categories: pressure nozzles, two-fluid nozzles and rotary devices. These devices are available commercially from Spraying Systems Company. The degree of atomization is determined by the fluid and or gas pressure along with the spray head bore size and design. The specified droplet size can be determined from commercial correlation charts which are available from suppliers. Preferably, an air injected atomizing nozzle is used. This type produces a much smaller droplet size in the range of 20 to 40 $\mu$m.

The process described above is preferably used as a pretreatment, alongside additional peroxy acid composition treatments. These additional treatments are preferably carried out in a device where intimate contact between a gas phase and a finely divided liquid phase or a finely divided gas phase and a liquid phase is obtained. Such devices, including sparged and agitated vessels and the various types of tray towers, can contact a gas phase with a liquid and can disperse the gas phase into bubbles or foams. Tray towers are typically the most important of these since countercurrent multistage contact and other contacting can be obtained. The gas can be contacted in the form of a finely divided or small bubble into a bulk liquid in a sparged vessel (bubble column). Finely divided gas or atmospheric bubbles can be dispersed into a mechanically agitated vessel in which the liquid contents are agitated to ensure close contact with the finely divided bubbles and the liquid. Multistage absorption can be obtained using multistage tray towers using a variety of towers, baffles, barriers, downspouts and other mechanical means to ensure close contact between the gas phase and the liquid phase. Venturi scrubbers can be used along with wetted-wall towers, spray towers and spray chambers, packed towers, and any other countercurrent or cocurrent apparatus that can ensure close contact between the atmospheric or odor containing gas phase and the liquid treatment. The process can be run either continuous or in semibatch or batch mode. During the process, the accumulated treatment composition containing a substantial quantity of the odor compounds and the oxidized odor compounds are removed from the process equipment and directed to typically on-site treatment or municipal sewage treatment plants. In smaller applications, or liquid/liquid applications a venturi system is preferred while in larger applications, a countercurrent scrubber towers can be preferred.

In a countercurrent column, the oxidative treatment solution is fed in the top of the absorber and the effluent or gas mixture enters from the bottom. The odor components of the gas reacts with and dissolves in the liquid treatment composition. The aqueous treatment composition containing the oxidized odor generating substances is removed from the bottom of the column. Conversely, in a cocurrent column both streams enter the column at one end and depart at the opposite end. In either case, the resulting treatment solution containing the scrubbed materials is then treated in an industrial, agricultural or municipal waste water treatment facility.

The vertical absorber may be a packed column operating either countercurrently or cocurrently, plate column operating either countercurrently or cocurrently, a falling film contactor or a simple spray absorption column operating cocurrently. Preferred packed columns can be shell filled with packing material designed to disperse the liquid and bring the liquid in finely divided form in close contact with the rising effluent stream. Packed columns offer simple and cheap construction and are preferred for complex or corrosive gases because packed columns can be made from ceramics or other non reactive packings. In plate towers, liquid flows from plate to plate in a cascade fashion while the effluent gas bubbles through the flowing liquid within each plate through a multitude of dispersing means or through the cascade of liquid as in a shower deck tray. These absorbers are used where tall columns are required.

The fundamental physical principles underlying the absorption of the odor molecules from the plant atmosphere effluent in a gas absorption reaction mode relates to the solubility of the reaction product between the peroxyacid (preferably peroxyacetic acid) oxidant liquid phase and the gas molecules. The rate of mass transfer is high (odor removal is efficient) because the reaction product, between the odor molecules and the organic peroxy acid oxidant, comprises molecules such as sulfate, alcohol, aldehyde, carboxylic acid and salts, ammonium ion ($NH_4^+$), protonated amines and other similar species which are highly soluble in water solutions particularly at acid pH. Since these oxidized and other non-oxidized materials are highly soluble in the aqueous treatment solutions, mass transfer principles tend to favor the dissolution of such materials in the aqueous treatment composition and result in highly efficient odor molecule scrubbing. The treatment compositions of the invention are adapted for use in commonly available scrubber systems. Such systems can be obtained from a variety of manufacturers including EST Corp., D.R. Technology, Inc., PEPCO and VIATEC. In smaller applications, a venturi contactor may be preferred.

The treatment compositions of the invention can be introduced into the wet scrubber in the form of a finely divided mist having an effective concentration of a peroxyacid treatment composition. The treatment compositions of the invention comprise a peroxy acid, preferably peroxyacetic acid having the formula:

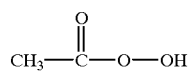

is used. The peroxy acid is an unstable composition that is typically made by the direct acid catalyzed equilibrium oxidation reaction between 5 to 98 wt % hydrogen peroxide in contact with the liquid carboxylic acid, typically acetic acid or by auto-oxidation of aldehydes, acid chlorides, carboxylic anhydrides with hydrogen peroxide or other peroxy oxidizing compositions.

Preferably, the process of the invention uses a combination of peroxyacetic acid, hydrogen peroxide and acetic acid. The compositions of the invention contain water, peroxy acid, hydrogen peroxide and carboxylic acid across a relatively broad range of concentrations. Peroxyacetic acid is a freely water soluble liquid having a pungent, acrid odor resembling acetic acid, but with a strong oxidizing character. The antimicrobial compositions of the invention also comprise a proportion of hydrogen peroxide. Hydrogen peroxide in combination with the peroxyacid, preferably peroxyacetic acid, provides a surprising level of successful odor scrubbing capacity when compared to conventional scrubbers. Hydrogen peroxide apparently provides an effervescent action in the treatment composition that tends to help in providing finely divided aqueous treatment particles that improve oxidation by the peroxyacid and absorption through small particles with large surface area. The concentration of hydrogen peroxide is adjusted with respect to the concentration of carboxylic acid, preferably acetic acid and water to ensure that the treatment composition contains preferably greater than about 1 ppm, preferably about 100 to 5000 ppm of dosed peroxy acid in the treatment composition for highly efficient odor molecule scrubbing. The concentration of the active ingredients in the treatment composition can be adjusted using make-up amounts of the concentrate material delivered to the continuously flowing aqueous stream during processing.

The odor control composition of the invention may also comprise any number of functional and non-functional adjuvants. Specifically, the compositions of the invention may comprise stabilizing agents, wetting agents, as well as pigments or dyes among other constituents. Stabilizing agents may be added to the composition of the invention to stabilize the peroxyacid and hydrogen peroxide to prevent the premature decomposition of the oxidizing material within the composition of the invention. Chelating agents or sequestrants are generally useful in the compositions of the invention in the form of alkyl diamine polyacetic acid-type chelating agents such as EDTA, acrylic and polyacrylic acid-type agents, phosphonic acid, and phosphonate-type chelating agents among others. Preferred sequestrants include phosphonic acid and phosphonic acid salts including 1-hydroxyethylidene-1,1-diphosphonic acid, amino[tri(methylenephosphonic acid)] and other phosphonate based sequestering agents. Also useful in the compositions of the invention are surfactant, wetting or defoaming agents. Wetting agents function to increase the surface area and reduce particle size of the particulate aqueous treatment composition. Such wetting agents are known within the art to raise the surface activity of the composition of the invention. Preferred wetting agents are low foaming nonionic surfactants which may be used comprising ethylene oxide moieties, propylene oxide moieties as well as a mixture thereof and (EO)(PO) heteric or block compositions. Defoaming agents comprising silica, silicones, aliphatic acids or esters, alcohols, sulfates, sulfonates, amines, amides, nonionic materials and others can be helpful in defoaming the mixture during processing. The treatment compositions of the invention may contain a number of other constituents selected by the operator to enhance the properties of the materials.

The treatment compositions of the invention can comprise concentrate materials that fall within the following generic formula:

| Ingredient | Treatment Concentrate | | |
| --- | --- | --- | --- |
|  | Useful Wt % | Working Wt % | Preferred Wt % |
| Peroxy acid | 1–40 | 2–30 | 4–20 |
| Hydrogen Peroxide | 1–50 | 3–40 | 5–30 |
| Carboxylic Acid | 1–90 | 3–60 | 5–40 |
| Sequestrant | 0.1–10 | 0.1–5 | 0.5–2 |
| Water | Balance | Balance | Balance |

The above compositions comprise concentrate materials that can be atomized into a scrubber apparatus. Since the odor is being treated with a low-flow, high surface area fog, the peroxy acid concentration of the treatment is typically higher than traditional water treatments using low surface area misting solutions. Such a concentrate can form a dosed concentration containing about 1 to 30,000 ppm peroxy acid, 1 to 30,000 ppm hydrogen peroxide, 1 to 5000 ppm of carboxylic acid and other active components, preferably about 100 to 5000 ppm peroxyacetic acid, 100 to 5000 ppm hydrogen peroxide, 20 to 300 ppm of acetic acid and other active components.

As a general guideline, the following table sets forth working ranges of active ingredients in the use treatment composition.

| Treatment Constituent | Dosed Concentrations | | |
| --- | --- | --- | --- |
|  | Useful (ppm) | Working (ppm) | Preferred (ppm) |
| Peroxy acid | 1–30,000 | 50–10,000 | 100–5,000 |
| Hydrogen Peroxide | 1–30,000 | 50–10,000 | 100–5,000 |
| Carboxylic Acid | 1–5,000 | 10–500 | 20–300 |
| Sequestrant | 0.01–50 | 0.01–25 | 0.01–10 |
| Water | Balance | Balance | Balance |

Another way to view composition ranges is to use ratios between various critical components. The first important ratio is that between the peroxy acid and the carboxylic acid.

The aqueous peroxy acid fog treatment composition comprises less than 4 part by weight, preferably less than 2.5 parts by weight, of peroxy acid per each part of carboxylic acid.

The second important ration is that between hydrogen peroxide and the peroxy acid. The aqueous peroxy acid fog treatment composition comprises less than 5 parts by weight of hydrogen peroxide per each part of peroxy acid, preferably less than 2 parts by weight of hydrogen peroxide per each part of peroxy acid.

Because active oxygen can come from more than one source, it is also important to consider the total active oxygen content. The aqueous peroxy acid fog treatment composition comprises a dosed peroxy acid and hydrogen peroxide concentration resulting in an active oxygen concentration of less than about 20,000 parts by weight of active oxygen per one million parts of the treatment, preferably less than about 5,000 parts by weight of active oxygen per one million parts of the treatment and more preferably less than about 2,000 parts by weight of active oxygen per one million parts of the treatment.

A particularly aqueous peroxy acid fog treatment composition comprises 1 to 90 weight percent (wt %) of acetic acid, 1 to 50 wt % of hydrogen peroxide, a sequestrant, and 1 to 40 wt % of peroxyacetic acid.

These concentrations are determined using the following formulas:

$$\text{Dosed Concentration} = \frac{\text{grams of active ingredient added}}{\text{grams of liquid solution}}$$

$$\text{Residual Concentration} = \frac{\text{grams of active ingredient detected by analysis after reaction}}{\text{grams of liquid solution}}$$

Traditionally, in removing odor compositions from an effluent stream, a continuous stream of the treatment composition is directed to the top of a scrubber column. The treatment composition flows counter-currently through the column to scrub odor compositions from the effluent gas. It is possible, however, to accomplish this using co-current flow if using a packed column or spray chamber. The spray chamber would utilize a high-flow (1 to 100 gallon per minute), low)surface area spray mist (1000–100,000 $\mu$m diameter droplets) to effect sufficient mass transfer of the odor compounds to the aqueous phase. The dosed peroxy acid concentration would typically be about 30 to 200 ppm in the spray. To maintain an effective concentration of the peroxyacetic acid in the treatment composition, a make up amount of the concentrate must be either continually or intermittently added to the continuous stream to maintain at least about 1 ppm of residual peroxyacetic acid, preferably at least about 2 and preferably at least 25 ppm of residual peroxyacetic acid during operations. In the current invention, a high surface area, concentrated peroxy acid fog (dosed peroxy acid is about 100 to 50,000 ppm (parts by weight of active peroxy acid per one million parts of solution), with a droplet size which ranges from 25 to 500 $\mu$m) is atomized in a pre-chamber or duct either before of after a conventional spray system. The atomized fog flow rate is only about one-tenth to one-fiftieth that found in conventional spray treatment. Thus, even though a high concentration of peroxy acid is utilized, the low flow rate allows for an enhanced economic treatment process over a conventional malodor reduction process.

In general, one cubic foot of atmosphere effluent is contacted with from 0.01 to 0.18 liters, preferably 0.02 to 0.1 liters, of aqueous treatment solution. Exemplary peroxyacetic acid formulas (equilibrium mixtures) are shown here:

EXAMPLE 1

| Ingredient | Wt % |
| --- | --- |
| Acetic Acid | 32.0 |
| Hydrogen Peroxide | 11.1 |
| Sequestrant | 1.5 |
| Peroxyacetic Acid | 41.0 |
| Water | balance |

EXAMPLE 2

| Ingredient | Wt % |
| --- | --- |
| Acetic Acid | 6.5 |
| Hydrogen Peroxide | 26.6 |
| Sequestrant | 1.0 |
| Peroxyacetic Acid | 4.7 |
| Water | balance |

EXAMPLE 3

| Ingredient | Wt % |
| --- | --- |
| Acetic Acid | 30.0 |
| Hydrogen Peroxide | 7.0 |
| Sequestrant | 1.0 |
| Peroxyacetic Acid | 5.0 |
| Peroctanoic Acid | 0.5 |
| Hydrotrope (coupling agent) | 5.0 |
| Octanoic Acid | 3.0 |
| Water | balance |

EXAMPLE 4

| Ingredient | Wt % |
| --- | --- |
| Acetic Acid | 46.0 |
| Hydrogen Peroxide | 4.0 |
| Sequestrant | 1.0 |
| POAA (Peroxyacetic acid) | 12.0 |
| POOA (Peroxyoctanoic acid) | 2.0 |
| Octanoic Acid | 8.2 |
| Water | 26.5 |

Process Parameters

In conventional odor reduction treatment processes, an aqueous solution is dispersed at the top of the scrubber apparatus. In typical applications, the aqueous treatment composition passes through the scrubber at a rate of about 100 to 30,000 L-min$^{-1}$, depending upon the size of the scrubber. Typically, the scrubber is a vertical wet scrubber having interior packing. The aqueous solution passes through the column packing in a finely divided form comprising streams, droplets, etc. through the column packing. The rate of solution flow is adjusted depending upon the size of the scrubber, the volumetric flow rate of gas, and the soil level of the gas.

The atmospheric effluent from the plant atmosphere is passed through the scrubber at a rate of about 100 to 3 million liters of atmosphere effluent per minute (atmos. L-min$^{-1}$). The temperature of the scrubber is maintained at ambient temperatures, however, somewhat elevated temperatures can enhance the oxidation and dissolution of the gas in the liquid stream. The wet scrubber can be operated continually at such ratios to efficiently remove odor compounds from the atmospheric stream. The odor compounds and oxidized odor compounds remain solubilized in the aqueous phase. After the odor reduction process is used for some period, the odor compounds are removed with a portion of the aqueous stream that can be removed from the scrubber continually. Such a proportion of the aqueous stream can comprise about 1 to 500 liters of the aqueous stream per hour (L-hr$^{-1}$). Alternatively, the aqueous stream can be removed batchwise or in its entirety periodically, e.g. every 4, 6, 12 or 24 hours, bi-weekly, weekly, etc. The process can then be restarted with fresh water and fresh treatment chemicals. The aqueous product of the treatment process is a relatively dilute solution of the treatment chemicals, sulfates, ammonia, alcohols, aldehydes and other common waste water components. The aqueous effluent resulting from the process is compatible with most industrial and municipal waste treatment facilities which can treat the aqueous effluent rendering it innocuous to the environment. In the invention, a concentrated, low-flow, high-surface area fog is added before, after or instead of a conventional system to enhance malodor reduction.

Preferably, the process of the invention is characterized wherein at least about 20 % of an odor forming compound selected from the group consisting of an oxo-hydrocarbon, organomercaptan, an amine, ammonia, hydrogen sulfide or mixtures thereof, is absorbed and removed in the process from the plant atmosphere effluent and wherein the odor threshold is reduced by at least 20%.

Detailed Discussion of the Drawings

FIG. 1a demonstrates a typical peroxy acid treatment as described in copending application Ser. No. 09/007,225, including a source of oxidant, a source of odor and effluent, the scrubber apparatus, the aqueous treatment and the resulting waste aqueous stream. A detailed description is as follows:

The source of the odor 1, which can be a large processing plant or as small as a kitchen, is typically an industrial plant or agricultural installation that handles large quantities of organic material, such as meat packing plants, animal rendering plants, composting plants, paper mills, sewage treatment plants, hog farms, dairy farms and other similar installations generate large quantities of odors that typically exit the plant in an odor contaminated atmospheric effluent flume. The air from this source is fed as stream 1 a into an air fan or pump 2, which then blows air into the scrubber tower 8 as stream 2a. A holding tank 3 is used as the source of peroxyacetic acid, acetic acid and hydrogen peroxide. This may actually be a series of holding tanks, as needed. These chemicals flow as stream 3a to the dosing pump 4, which is used to add chemicals to the aqueous stream 4a as needed. A source of clean water 5 is used as needed to add or make up water to the water in the aqueous stream via pipeline 5a, which flows to mixing valve 5'. From this valve, the correctly mixed aqueous stream 5b, is directed to the holding tank 6. Tank 6 can be incorporated into the bottom of tower 8 if convenient. From this tank 6, the aqueous stream 6a flows to a water pump 7 which provides the necessary pressure to force the aqueous stream 7a through the scrubber tower 8 at the desired rate.

The scrubber tower 8 is used to provide the necessary contacting area between the peroxyacid containing aqueous stream 7a and the odor-causing compounds within the gaseous phase 2a. The tower operates countercurrently, meaning that the aqueous stream 7a enters at the top and exits the bottom while the air stream 2a enters the bottom and exits at the top. The air stream 8b exiting the top of the tower flows to an optional stack 10. The aqueous stream 8a exiting the bottom of the tower flows to diverter valve 8", which recycles a portion of the aqueous flow back to the holding tank 6 while diverting the remainder as waste stream 9. Alternatively, the contacting column 8' can also operate cocurrently.

Figure 1B:
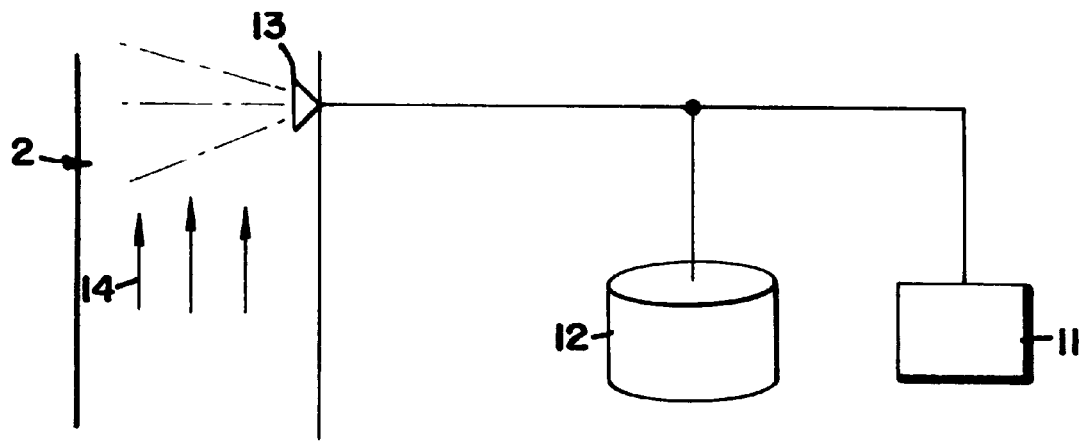

FIG. 1b shows the peroxy acid pretreatment process of the invention. Odor laden airflow 14 is seen passing through air inlet 2. Compressor 11 is used along with atomizer 13 to provide a fogged peroxy acid pretreatment into the airflow 14. Also seen is a peroxy acid pretreatment solution source 12.

Figure 2B:
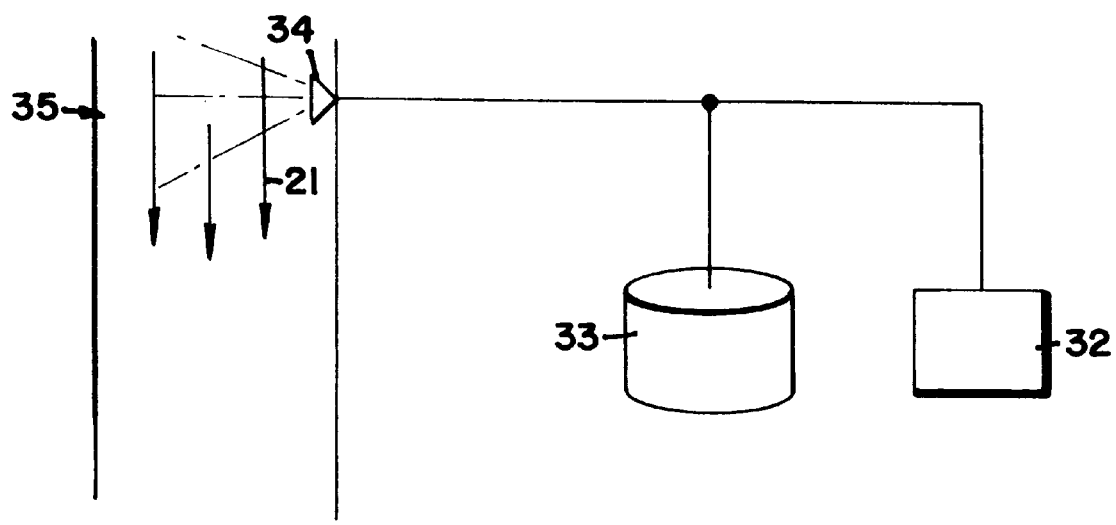
Figure 2A:
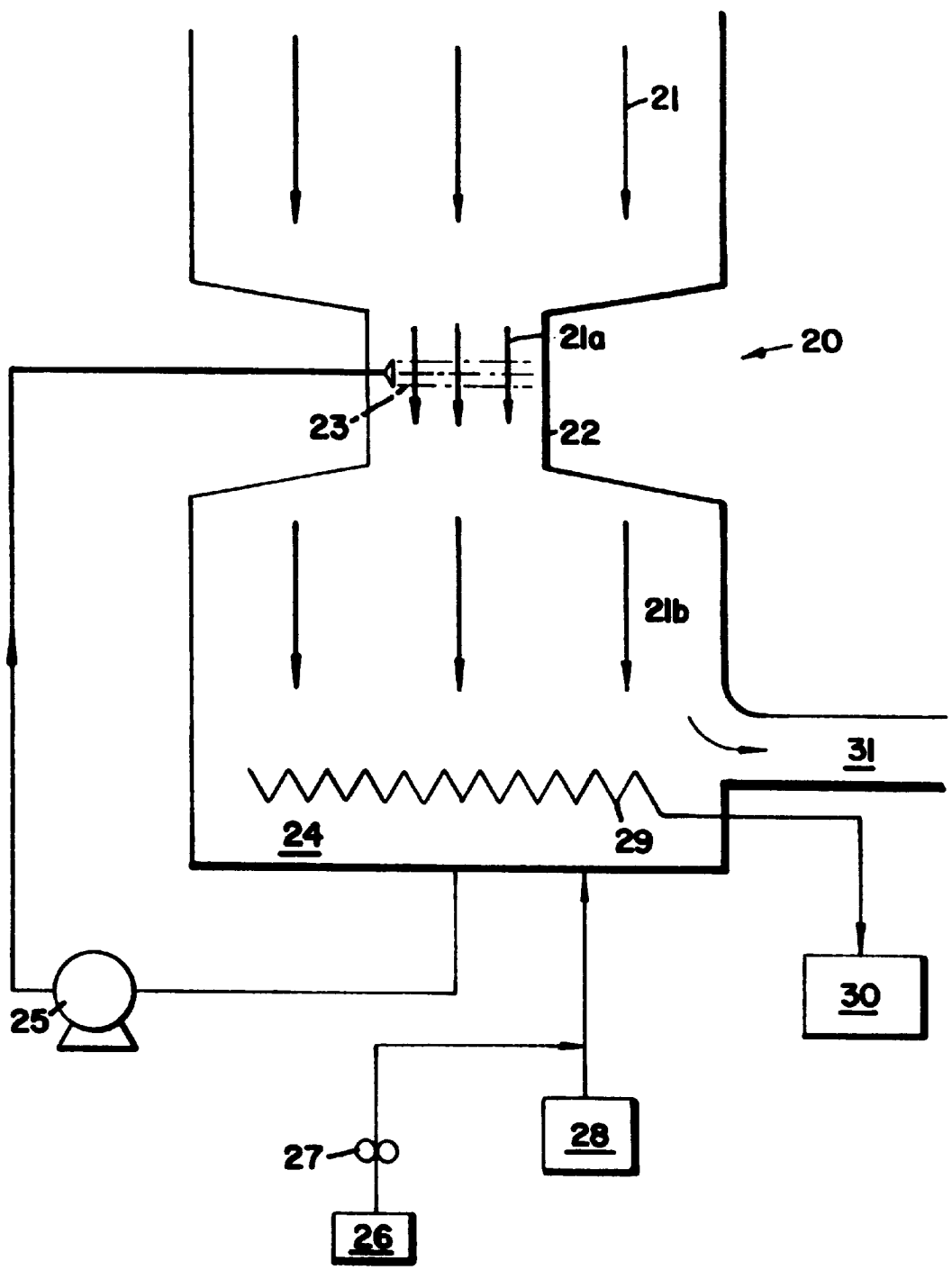
FIG. 2a shows a venturi used as a means to contact the odor laden atmosphere or liquid effluent with the aqueous peroxyacid composition.

FIG. 2a shows generally a venturi system 20 that can be used to contact odor laden air with the peroxy acid treatment. This installation can be used in smaller locations such as hog barns, effluent lagoons, etc. In FIG. 2, odor laden fluid, air or liquid, 21 enters the venturi 20 through air inlet 35. The fluid 21 enters the restricted area 22, in the venturi 20, that produces an area of increased speed and reduced pressure. In the restricted area 22 the odor laden fluid 21a is contacted with the spray 23 from a source of peroxy acid treatment 24. The treated fluid 21b with reduced odor exits the venturi 20 at vent or air exit 31. The treatment solution 24 is directed to the venturi 20 restricted area 22 using pump 25. Make-up water results from water source 28. Make up peroxy acid (peroxyacetic acid) is provided by source 26 and metering pump 27. Over flow or excess treatment solution is drawn off by overflow means 29 to a sewage treatment zone 30. The fluid 21 can be forced into the venturi 20 or can be drawn from the venturi 20 from the vent 31.

FIG. 2b shows a portion of FIG. 2a, demonstrating how the peroxy acid pretreatment of the invention can be incorporated into the greater odor reduction scheme outlined in FIG. 2a. Specifically, the odor laden inflow 21 is seen passing through the air inlet 35. A compressor 32 and a peroxy acid solution source 33 are used to provide an atomized pretreatment spray via atomizer 34. The pretreated air then passes along to receive additional treatment as seen in FIG. 2a.

WORKING EXAMPLE #1

The current application method of using micron-sized (25 to 500 μm) peroxy acid fogs was compared to the peroxy acid treatments described in copending patent application Ser. No. 09/007,225. In the first working example, hydrogen sulfide levels were monitored during the hydrolyzing of chicken feathers. This process generates a continuous low-level background of hydrogen sulfide followed by high level bursts when the feathers are transferred from the oven to the dryer. The reduction of this high-level odor in intensity and the rate at which it occurs is critical to emission regulations. In table 1, experiment 1 is the method previously described while experiments 2 and 3 pertain to the current method. Level 1 refers to a peroxyacetic acid dosed level of 500 ppm while level 2 refers to a peroxyacetic acid dosed level of 2,500 ppm.

TABLE 1

| Treatment Method | $H_2S$ Level five minutes after malodor release[a] | Time to return to pre-release level of $H_2S$ |
|---|---|---|
| 1 prior art[b]: conventional spray 1,000 to 10,000 μm) | 58 ppm | 15 minutes |
| 2 invention: sub-millimeter atomized fog spray, level 1 peroxy acid (25 to 500 μm) | 14 ppm | 5 minutes |
| 3 invention: sub-millimeter atomized fog spray, level 2 peroxy acid (25 to 500 μm) | 7 ppm | 4 minutes |

[a]From an industrial Feather Scrubber releasing bursts of malodorous hydrogen sulfide.
[b]The peroxyacetic application as per patent application 09/007,255.

The test results show a significant improvement both in residual malodor after five minutes and in the speed in which the malodors are removed.

WORKING EXAMPLE #2

Table 2 demonstrates the composite odor reduction from the new peroxy acid application method, as measured by olfactory evaluation from grab samples. Odor samples were taken via air pump and collected in Tedlar sampling bags. The samples were evaluated by an olfactory panel, and all scores were averaged. The results are tabulated on a scale of 1 to 10, wherein 10 indicates most malodorous.

TABLE 2

| | Treatment Method | Odor Ranking |
|---|---|---|
| 1 | prior art[b] conventional spray: (1,000 to 10,000 μm) | 6.2 |
| 2 | invention: atomized fog spray, level 1 peroxy acid (25 to 500 μm) | 5.0 |
| 3 | invention: atomized fog spray, level 2 peroxy acid (25 to 500 μm) | 4.6 |

[a]An odor panel of 6 members; samples were taken five minutes after the malodor was introduced into the air stream.
[b]The peroxyacetic application as per patent application 09/007,255.

The data demonstrates the added advantage of the current peroxy acid fogging method over the previous treatment method. A comparison of experiment 1 with experiment 3 shows a reduction of 1.6 units; whereas a reduction of 0.5 units is deemed significant.

WORKING EXAMPLE #3

Table 3 compares a conventional spray treatment to the fogging method. The conventional spray treatment uses a venturi/packed tower system with dosed internal sprays of 5,000 to 40,000 μm droplet sized peroxyacetic acid at 30 to 100 ppm peroxy acid while the invention method uses 40 to 100 μm sized droplets of 1000 to 15,000 ppm dosed peroxy acid. The total spray flow in the conventional system was about 40 gallons per minute while the improved fogging method had a spray rate of only about 1.6 gallons per minute.

TABLE 3

| | Treatment Condition | Odor Evaluation[1] | | |
|---|---|---|---|---|
| | | Peroxy acid Concentration (ppm) | Total Peroxy acid Use (gallons per day) | Odor Rating (1–10, 10 = best) "Non-Condensable Odor Intensity"[2] |
| | Control Studies | | | |
| 1 | Peroxyacetic Acid Conventional Spray[3] | 30 | 12 | 3 |
| 2 | Peroxyacetic Acid Conventional Spray[3] | 100 | 40 | 5 |
| | Invention Examples | | | |
| 3 | Peroxyacetic Acid Atomized Fog[4] | 1,000 | 1.3 | 5 |
| 4 | Peroxyacetic Acid Atomized Fog[4] | 15,000 | 22 | 8 |

[1]Odor rating from an industrial rendering plant olfactory analysis of relative intensities and detection thresholds.
[2]Odor intensity as measured by the rendering facility as "sharpness" of the malodors from the treated stack. Usually defined in the industry as the site perimeter level of "non-condensables, cooker smell and sulfides."
[3]Peroxyacetic conventional spray using low surface area, large droplet sized sprays in a packed tower.
[4]Fogging atomizer using high surface area, small droplet, low solution-flow fogs in open ductwork.

As seen in Example 1 and Example 2, Table 3 demonstrates the improved art of using a high-concentration, low-flow, high-surface area peroxy acid fog for control of non-condensable odors. These non-condensables are easily recognizable in the rendering industry and are characterized by a bitter/burnt/decay odor profile. The data demonstrates the improvement on odor control with less peroxy acid consumption using the current method over the prior art. In all these examples the resulting data shows more than an additive or linear result from the improved inventive technology.

The above specification, example and data provide a clear basis for understanding the operation of the compositions and methods of the invention. While the invention can be embodied in a variety of specific examples and processes, the invention resides in the claims hereinafter appended.

We claim:

1. A pre-treatment or post-treatment process for removing an odor from an atmospheric effluent, the process comprising contacting an atmospheric effluent comprising an odor component with a finely divided aqueous peroxy acid treatment composition, forming an oxidized odor component and dissolving the oxidized odor component or an odor component in the aqueous treatment composition to form a treated effluent and returning the treated effluent to another treatment step or to the atmosphere; wherein the finely divided aqueous peroxy acid treatment composition has an average droplet size of 25 to 500 μm.

2. The process of claim 1 wherein the atmospheric effluent originates from a plant treating organic material, the odor selected from the group consisting of an organic sulfur compound, an oxo-hydrocarbon, an organic nitrogen or mixtures thereof.

3. The process of claim 1 wherein the atmospheric effluent originates from a plant treating organic material, the odor selected from the group consisting of an inorganic sulfur compound, an inorganic nitrogen compound and mixtures thereof.

4. The process of claim 1 wherein the inorganic sulfur compound comprises hydrogen sulfide.

5. The process of claim 1 wherein the inorganic nitrogen compound comprises ammonia.

6. The process of claim 1 wherein the odor is removed as measured by an odor threshold score which is reduced by 20% or more.

7. The process of claim 1 wherein contact between the effluent and the fogged peroxy acid treatment occurs in the tower stack of a wet scrubber.

8. The process of claim 7 wherein one cubic foot of plant atmospheric effluent is contacted with about 0.01 to 0.18 liters of aqueous treatment solution.

9. The process of claim 7 wherein the scrubber comprises a packed column.

10. The process of claim 1 wherein contact between the effluent and the fogged peroxy acid treatment occurs in the venturi head of a venturi contactor.

11. The process of claim 1 wherein the aqueous peroxy acid fog treatment composition comprises a peroxyacetic acid composition.

12. The process of claim 11 wherein the aqueous peroxy acid fog treatment composition comprises less than 4 parts by weight of peroxyacetic acid per each part of acetic acid.

13. The process of claim 11 wherein the aqueous treatment composition comprises less than 2.5 parts by weight of peroxyacetic acid per each part of acetic acid.

14. The process of claim 11 wherein the aqueous peroxy acid fog treatment composition comprises less than 5 parts by weight of hydrogen peroxide per each part of peroxyacetic acid.

15. The process of claim 11 wherein the aqueous peroxy acid fog treatment composition comprises less than 2 parts by weight of hydrogen peroxide per each part of peroxyacetic acid.

16. The process of claim 11 wherein the aqueous peroxy acid fog treatment composition comprises 1 to 90 weight percent (wt %) of acetic acid, 1 to 50 wt % of hydrogen peroxide, a sequestrant, and 1 to 40 wt % of peroxyacetic acid.

17. The process of claim 16 wherein the sequestrant comprises 1-hydroxyethylidene-1,1-diphosphonic acid.

18. The process of claim 1 wherein the aqueous peroxy acid fog treatment composition comprises a dosed peroxy acid concentration of less than about 30,000 parts by weight per one million parts of the treatment.

19. The process of claim 1 wherein the aqueous peroxy acid fog treatment composition comprises a dosed peroxy acid concentration of less than about 10,000 parts by weight per one million parts of the treatment.

20. The process of claim 1 wherein the aqueous peroxy acid fog treatment composition comprises a dosed peroxy acid concentration of less than about 5,000 parts by weight per one million parts of the treatment.

21. The process of claim 1 wherein the aqueous peroxy acid fog treatment composition comprises a dosed peroxy acid and hydrogen peroxide concentration resulting in an active oxygen concentration of less than about 20,000 parts by weight of active oxygen per one million parts of the treatment.

22. The process of claim 1 wherein the aqueous peroxy acid fog treatment composition comprises a dosed peroxy acid and hydrogen peroxide concentration resulting in an active oxygen concentration of less than about 5,000 parts by weight of active oxygen per one million parts of the treatment.

23. The process of claim 1 wherein the aqueous peroxy acid fog treatment composition comprises a dosed peroxy acid and hydrogen peroxide concentration resulting in an active oxygen concentration of less than about 2,000 parts by weight of active oxygen per one million parts of the treatment.

24. The process of claim 1 wherein at least about 20% of an odor forming compound selected from the group consisting of an oxo-hydrocarbon, organomercaptan, an amine, ammonia, hydrogen sulfide or mixtures thereof, is absorbed and removed in the process from the plant atmopsheric effluent and wherein the odor threshold is reduced by at least 20%.

25. A process for removing an odor from an atmospheric effluent, the process comprising:
    a pre-treatment process as described in claim 1; and subsequently:
    (a) contacting an atmospheric effluent comprising an odor component with a finely divided aqueous peroxy acid treatment composition, forming an oxidized odor component and dissolving the oxidized odor component or an odor component in the aqueous treatment composition to form an aqueous treatment composition containing the odor or oxidized odor;
    (b) removing at least a portion of the aqueous treatment composition containing the odor or oxidized odor; and
    (c) returning the effluent with reduced odor to the atmosphere.

26. The process of claim 25 wherein the atmospheric effluent originates from a plant treating organic material, the odor selected from the group consisting of an organic sulfur compound, an oxo-hydrocarbon, an organic nitrogen or mixtures thereof.

27. The process of claim 25 wherein the odor is removed as measured by an odor threshold score which is reduced by 20% or more.

28. The process of claim 25 wherein a wet scrubber tower is used to contact the effluent with the treatment.

29. The process of claim 28 wherein one cubic foot of plant atmopsheric effluent is contacted with about 0.02 to 0.1 liters of aqueous treatment solution.

30. The process of claim 28 wherein the scrubber comprises a packed column.

31. The process of claim 25 wherein a venturi contactor is used to contact the effluent with the treatment.

32. The process of claim 25 wherein the aqueous treatment composition comprises a peroxyacetic acid composition.

33. The process of claim 32 wherein the aqueous treatment composition comprises less than 4 parts by weight of peroxyacetic acid per each part of acetic acid.

34. The process of claim 32 wherein the aqueous treatment composition comprises less than 2.5 parts by weight of peroxyacetic acid per each part of acetic acid.

35. The process of claim 32 wherein the aqueous treatment composition comprises less than 5 parts by weight of hydrogen peroxide per each part of peroxyacetic acid.

36. The process of claim 32 wherein the aqueous treatment composition comprises less than 2 parts by weight of hydrogen peroxide per each part of peroxyacetic acid.

37. The process of claim 32 wherein the aqueous treatment composition comprises 1 to 90 weight percent (wt %) of acetic acid, 1 to 50 wt % of hydrogen peroxide, a sequestrant, and 1 to 40 wt % of peroxyacetic acid.

38. The process of claim 37 wherein the sequestrant comprises 1-hydroxyethylidene-1,1-diphosphonic acid.

39. The process of claim 25 wherein the aqueous peroxy acid treatment composition comprises a dosed peroxy acid concentration of less than about 30,000 parts by weight per one million parts of the treatment.

40. The process of claim 25 wherein the aqueous peroxy acid treatment composition comprises a dosed peroxy acid concentration of less than about 10,000 parts by weight per one million parts of the treatment.

41. The process of claim 25 wherein the aqueous peroxy acid treatment composition comprises a dosed peroxy acid concentration of less than about 5,000 parts by weight per one million parts of the treatment.

42. The process of claim 25 wherein the aqueous peroxy acid treatment composition comprises a dosed peroxy acid and hydrogen peroxide concentration resulting in an active oxygen concentration of less than about 20,000 parts by weight of active oxygen per one million parts of the treatment.

43. The process of claim 25 wherein the aqueous peroxy acid treatment composition comprises a dosed peroxy acid and hydrogen peroxide concentration resulting in an active oxygen concentration of less than about 5,000 parts by weight of active oxygen per one million parts of the treatment.

44. The process of claim 25 wherein the aqueous peroxy acid treatment composition comprises a dosed peroxy acid and hydrogen peroxide concentration resulting in an active oxygen concentration of less than about 2,000 parts by weight of active oxygen per one million parts of the treatment.

45. The process of claim 25 wherein at least about 20% of an odor forming compound selected from the group consisting of an oxo-hydrocarbon, organomercaptan, an amine, ammonia, hydrogen sulfide or mixtures thereof, is absorbed and removed in the process from the plant atmospheric effluent and wherein the odor threshold is reduced by at least 20%.

46. A pre-treatment or post-treatment process for removing an odor from an atmopsheric effluent, the process comprising contacting an atmopsheric effluent comprising an odor component with from about 0.1 to 3 gallons per minute of a finely divided aqueous peroxy acid treatment composition comprising at least about 100 ppm of peroxyacetic acid, at least about 100 ppm of hydrogen peroxide and at least about 20 ppm of acetic acid, forming an oxidized odor component and dissolving the oxidized odor component or an odor component in the aqueous treatment composition; wherein the finely divided aqueous peroxy acid treatment composition has an average droplet size of 25 to 500 μm.

* * * * *

UNITED STATES PATENT AND TRADEMARK OFFICE
CERTIFICATE OF CORRECTION

PATENT NO.    : 6,183,708 B1
DATED         : February 6, 2001
INVENTOR(S)   : Hei et al.

It is certified that error appears in the above-identified patent and that said Letters Patent is hereby corrected as shown below:

<u>Column 15,</u>
Line 4, "claim 1" should read -- claim 3 --
Line 6, "claim 1" should read -- claim 3 --

Signed and Sealed this

Second Day of July, 2002

Attest:

Attesting Officer

JAMES E. ROGAN
*Director of the United States Patent and Trademark Office*